UNITED STATES PATENT OFFICE.

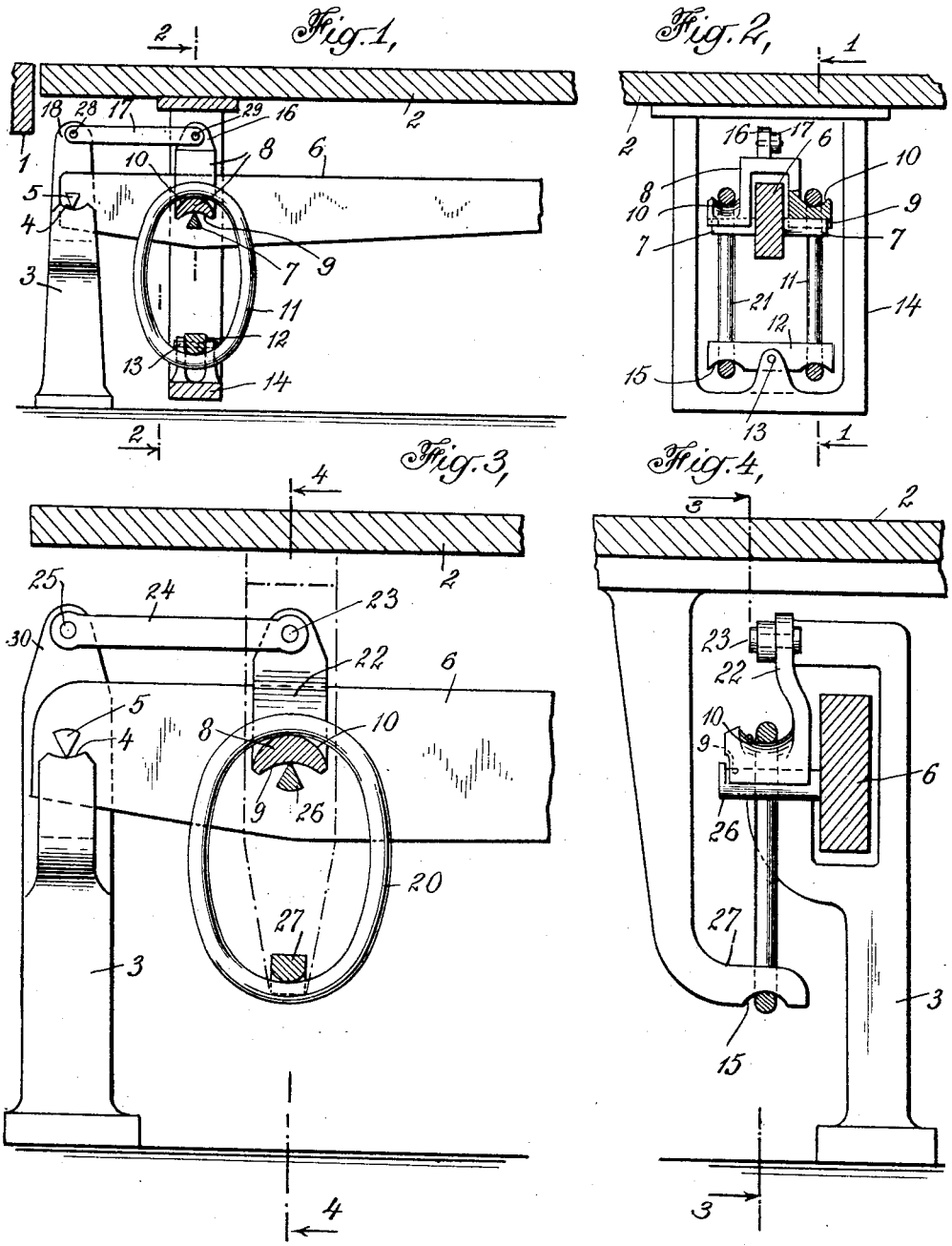

MANFORD D. VARNEY, OF NEW YORK, N. Y.

SCALE BEARING DEVICE.

1,302,884.  Specification of Letters Patent.  Patented May 6, 1919.

Application filed December 13, 1917. Serial No. 206,885.

*To all whom it may concern:*

Be it known that I, MANFORD D. VARNEY, a citizen of the United States, and resident of the borough of Manhattan, city, county, and State of New York, have made a certain new and useful Invention Relating to Scale Bearing Devices, of which the following is a specification, taken in connection with the accompanying drawing, which forms part of the same.

This invention relates especially to bearing devices adapted for use on platform scales so as to minimize undesirable or injurious movement between the load bearings and their pivots when the scale platform is moved laterally as when a load is being placed upon or removed from the platform. One or more of the load bearings may be connected by suitable anchor connections to each other or to stationary members preferably by horizontal or parallel link connections. In this way movement of the load platform need not cause any substantial or undesirable movement of the bearings on their pivots and when each of the load bearings is, for instance, connected to a stationary element such as the bracket on which the load lever is pivoted by a horizontally arranged anchor link pivoted to these parts and substantially parallel to the acting knife edges of the load pivot and lever pivot, the accuracy of the scale need not be undesirably affected. One or more loosely swinging suspension link members may engage each of the load bearings which are preferably formed with curved bearing faces for engagement therewith and the platform supports on which the platform is mounted have suitable sockets or members for engagement with the lower ends of the suspension links or members. In this way a considerable degree of circular or other movement of the platform is allowed without causing any substantial or undesirable movement between the load bearings and their pivots.

In the accompanying drawing showing in a somewhat diagrammatic way several illustrative embodiments of this invention.

Figure 1 is a side sectional view taken substantially along the line 1—1 of Fig. 2 showing a double pivot arrangement.

Fig. 2 is a transverse section thereof taken substantially along the line 2—2 of Fig. 1.

Fig. 3 is a side sectional view taken substantially along the line 3—3 of Fig. 4 showing a single pivot arrangement; and Fig. 4 is a transverse section thereof taken substantially along the line 4—4 of Fig. 1.

In the illustrative arrangement shown in Figs. 1 and 2 of the drawings, the scale platform 2 may be mounted so as to be substantially flush with the platform frame or rim 1 and may be supported by a number of depending platform supports or members, such as 14, rigidly secured to the lower part of the platform. A number of load levers 6 of any suitable size, construction and arrangement may each be pivoted to its coöperating lever bracket 3 rigidly supported in any suitable way. This bracket may be formed with one or more bracket bearings 4 of suitable form with which the lever pivots or bracket pivots 5 preferably rigidly secured to the load lever 6 and projecting from both sides thereof may coöperate in a well known manner. One or more load pivots 7 may be rigidly secured to the load lever so as to preferably have their upper acting edges substantially in the same horizontal plane as the lower acting edges of the lever pivots 5. As indicated in Fig. 2 this load pivot may project from both sides of the load lever in this double pivot type of construction. The load bearing 8 may have a lower bearing face 9 to coöperate with the load pivot and may have a yoke form so as to loosely extend up over the load lever and have free movement with respect thereto, although any suitable form of anchor connection may coöperate with one or more of these load bearings so as to prevent undesirable movement of the bearings with respect to the load pivots when the platform moves laterally. One or more suspending members, such for instance, as the links 11, 21, may be used to support the platform from each of the load bearings which are preferably formed with a curved upper bearing face 10 so as to allow a considerable degree of rocking movement between these parts. A similarly rocking support or contact member may coöperate with the lower ends of these links. For this purpose a stirrup form of support 12 may be used in the double pivot type of construction and may have support sockets 15 of rounded contour to coöperate with the lower ends of the links, as shown in Figs. 1 and 2. The stirrup may be loosely or pivotally connected to the platform support as by the pin 13 allowing for the equalizing swinging movement of these parts when the direction of movement of the platform is lateral as the parts are shown in Fig. 2. It is thus seen that in addition to this lateral movement the links may also swing freely in their own plane so that a free rocking movement is allowed in both these perpendicular directions, making possible a circular or any other lateral movement of the platform without transmitting any undesirable shock or strain to the bearings or load levers.

The anchor connection holding the load bearings against undesirable movement under these conditions may advantageously comprise a substantially horizontal anchor link pivotally or otherwise loosely connecting the load bearing to a stationary part or element, and if desired this anchor connection may be of the parallel link type, that is, it may be parallel to and of substantially the same length as the lever arm between the acting edges of the load pivot and lever pivot supporting the load lever. This is indicated in Figs. 1 and 2 where the load bearing is formed with an anchor extension 16 pivotally connected by the pin 29 with the horizontal anchor link 17 which may be similarly pivoted as by the pin 28 to the bracket lug or extension 18 formed integral with or secured to the lever bracket 3. In this way the anchor link between the centers of its pivots may advantageously be given the same length as the distance between the active edges of the load pivot 7 and lever pivot 5 of this load lever, so that a parallel linkage is secured and adapted to maintain the load bearing in its substantially stationary vertical position during lateral movement of the scale platform while not interfering with or counteracting the vertically acting loads transmitted to the lever by the platform during the weighing operation.

Figs. 3 and 4 show a single side pivot type of arrangement in which each one of the load levers 6 may be provided with a load pivot 26 coöperating with the load bearing 8 which may have an upward anchor extension 22 pivoted by the pin 23 to the anchor link 24. The other end of this link may be pivoted as by the pin 25 to an upward bracket extension 30 formed integral, for instance, with the lever bracket 3. The lever pivot 5 may also be rigidly secured to the load lever 6 and coöperate with the bracket bearing 4 of any suitable construction, so that the acting edges of these pivots are in substantially the same horizontal plane and substantially parallel to the anchor link 24 and of practically the same effective length. In this instance only a single suspension member or link 20 is needed and this coöperates with the upper curved bearing face 10 of the load bearing and with a similar curved face on the support socket 15 which may be formed in the laterally extending lower end of the platform support 27 rigidly secured at its upper end to the scale platform 2. In this way the link or other form of supporting member may have free rocking movement with reference to these two coöperating parts and thus allow the lateral movement of the scale platform to a reasonable extent in any direction as above indicated.

This invention has been described in connection with a number of illustrative embodiments, forms, proportions and numbers of parts, materials and arrangements, to the details of which disclosure the invention is not of course to be limited, since what is claimed as new and what is desired to be secured by Letters Patent is set forth in the appended claims.

1. In platform scales, a scale platform, depending platfrom supports secured to said scale platform, pivoted load levers, having double load pivots secured thereto and projecting from both sides of the same, a yoke shaped load bearing coöperating with each of said load pivots and loosely extending over the adjacent portion of the connected load lever, a pair of closed loop link suspension members loosely engaging each of said load bearings on both sides of the load lever, a support stirrup having curved supporting sockets loosely engaging the lower ends of said suspension members and pivotally connected adjacent its central portion to said platform support to allow free lateral movement of said scale platform by the rocking movement of said suspension members with respect to the coöperating parts and a pivoted anchor connection holding each of said load bearings against undesirable movement with respect to its coöperating pivot during such lateral movement of the scale platform.

2. In platform scales, a scale platform, depending platform supports secured to said scale platform, pivoted load levers, having double load pivots secured thereto and projecting from both sides of the same, a yoke shaped load bearing coöperating with each of said load pivots and loosely extending over the adjacent portion of the connected load lever, a pair of link suspension members loosely engaging each of said load bearings on both sides of the load lever, a support stirrup having curved supporting sockets loosely engaging the lower ends of said suspension members and connected adjacent its central portion to said platform support to allow free lateral movement of said scale platform by the rocking movement of said suspension members with respect to the coöperating parts and an anchor connection holding said load bearings against undesirable movement with respect to its coöperating pivot during such lateral movement of the scale platform.

3. In platform scales, a scale platform, depending platform supports secured to said scale platform, load levers each having a load pivot, a coöperating load bearing, a link suspension member loosely engaging each of said load bearings, a curved supporting socket loosely engaging the lower end of said suspension member and connected to said platform support to allow free lateral movement of said scale platform by the rocking movement of said suspension members with respect to the coöperating parts and an anchor connection holding each of said load bearings against undesirable movement, with respect to its coöperating pivot during such lateral movement of the scale platform, said anchor connection comprising a substantially horizontal anchor link pivotally connected to said load bearing and having a length substantially equal to the distance between the acting edges of said load pivot and lever pivot.

4. In platform scales, a scale platform, depending platform supports secured to said scale platform, load levers each having a load pivot, a coöperating load bearing, a link suspension member loosely engaging each of said load bearings, a support loosely engaging the lower end of said suspension member and connected to said platform support to allow free lateral movement of said scale platform by the rocking movement of said suspension members with respect to the coöperating parts and an anchor connection holding each of said load bearings against undesirable movement with respect to its coöperating pivot during such lateral movement of the scale platform, said anchor connection comprising a substantially horizontal anchor link pivotally connected to said load bearing.

5. In platform scales, a scale platform, depending platform supports secured to said scale platform, load levers each having a coöperating load bearing, a suspension member loosely engaging each of said load bearings, a support loosely engaging the lower end of said suspension member and connected to said platform support to allow free lateral movement of said scale platform, by the rocking movement of said suspension members with respect to the coöperating parts and an anchor connection holding each of said load bearings against undesirable movement with respect to its coöperating pivot during such lateral movement of the scale platform.

6. In platform scales, a scale platform, depending platform supports secured to said scale platform, load levers each having a load pivot, a coöperating load bearing, a closed loop suspension member loosely engaging each of said load bearings, a support loosely engaging the lower end of said suspension member and connected to said platform support to allow free lateral movement of said scale platform and an anchor connection holding said load bearings against undesirable movement with respect to its coöperating pivot during such lateral movement of the scale platform.

7. In platform scales, a scale platform, depending platform supports secured to said scale platform, pivoted load levers, a load pivot secured to each of said load levers, a load bearing coöperating with each of said load pivots, link suspension members loosely engaging each of said load bearings, supporting socket members loosely engaging the lower end of said suspension members, and connected to said platform support to allow free lateral movement of said scale platform by the rocking movement of said suspension members with respect to the coöperating parts and a horizontal pivoted link anchor connection holding said load bearings against undesirable movement with respect to its coöperating pivot during such lateral movement of the scale platform.

8. In platform scales, a scale platform, depending platform supports secured to said scale platform, pivoted load levers, a load pivot secured to each of said load levers, a load bearing coöperating with each of said load pivots, suspension members loosely engaging each of said load bearings, supporting members loosely engaging the lower end of said suspension members and connected to said platform support to allow free lateral movement of said scale platform by the rocking movement of said suspension members with respect to the coöperating parts and an anchor connection holding said load bearings against undesirable movement with respect to its coöperating pivot during such lateral movement of the scale platform.

9. In platform scales, a scale platform, a depending platform support secured to said scale platform, a load lever having a load pivot, a load bearing coöperating with said load pivot, a link suspension member loosely engaging said load bearing, a supporting socket loosely engaging the lower end of said suspension member and connected to said platform support to allow free lateral movement of said scale platform by the rocking movement of said suspension member, with respect to the coöperating parts
5 and a substantial horizontal anchor connection holding said load bearing against undesirable movement with respect to its coöperating pivot during such lateral movement of the scale platform.

MANFORD D. VARNEY.

Witnesses:
HARRY L. DUNCAN,
JESSIE B. KAY.

Copies of this patent may be obtained for five cents each, by addressing the "Commissioner of Patents. Washington, D. C."